July 9, 1940.	C. W. MEGOW	2,206,970
MOTOR VEHICLE CHASSIS
Filed June 13, 1938	4 Sheets-Sheet 1
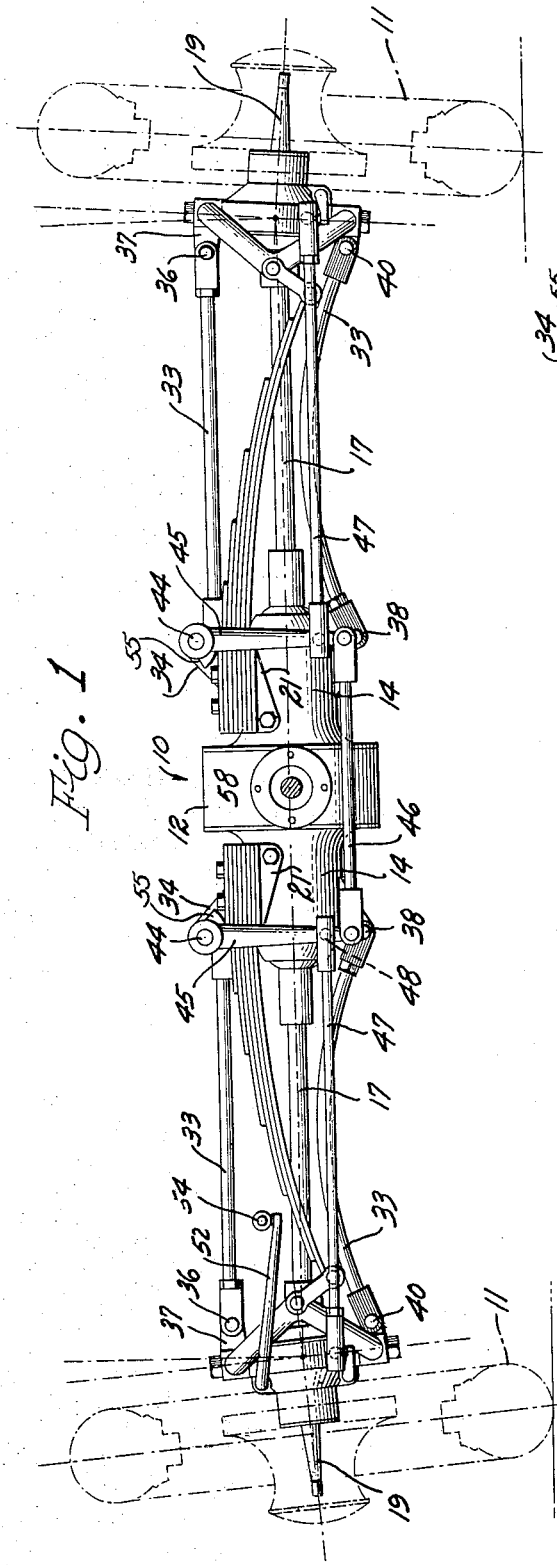
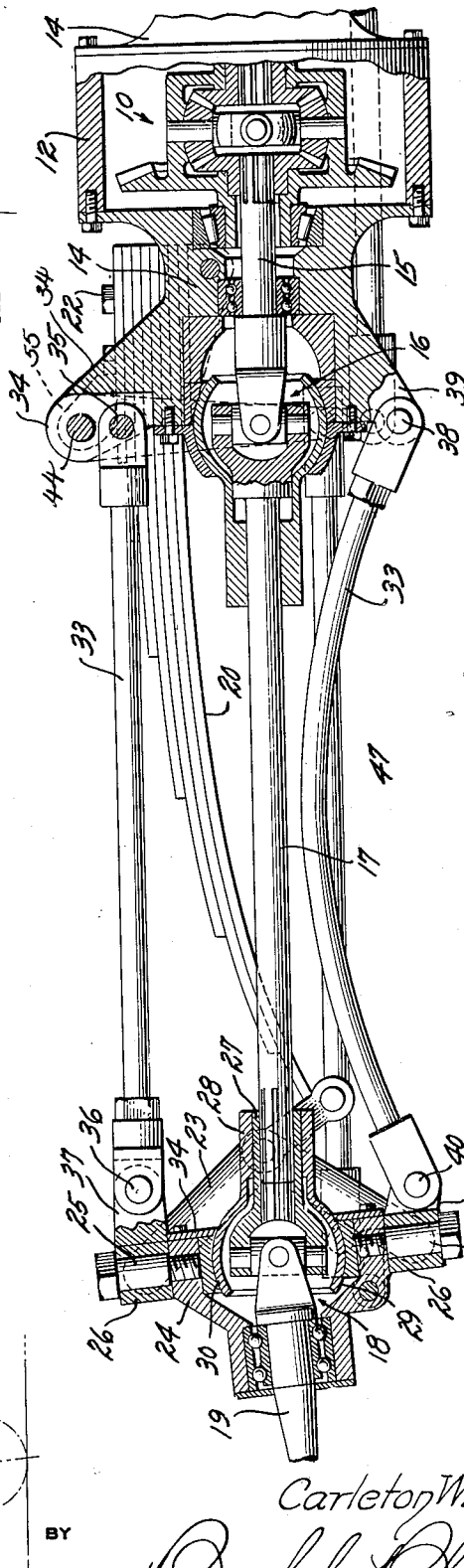
INVENTOR
Carleton W. Megow,
BY
ATTORNEYS

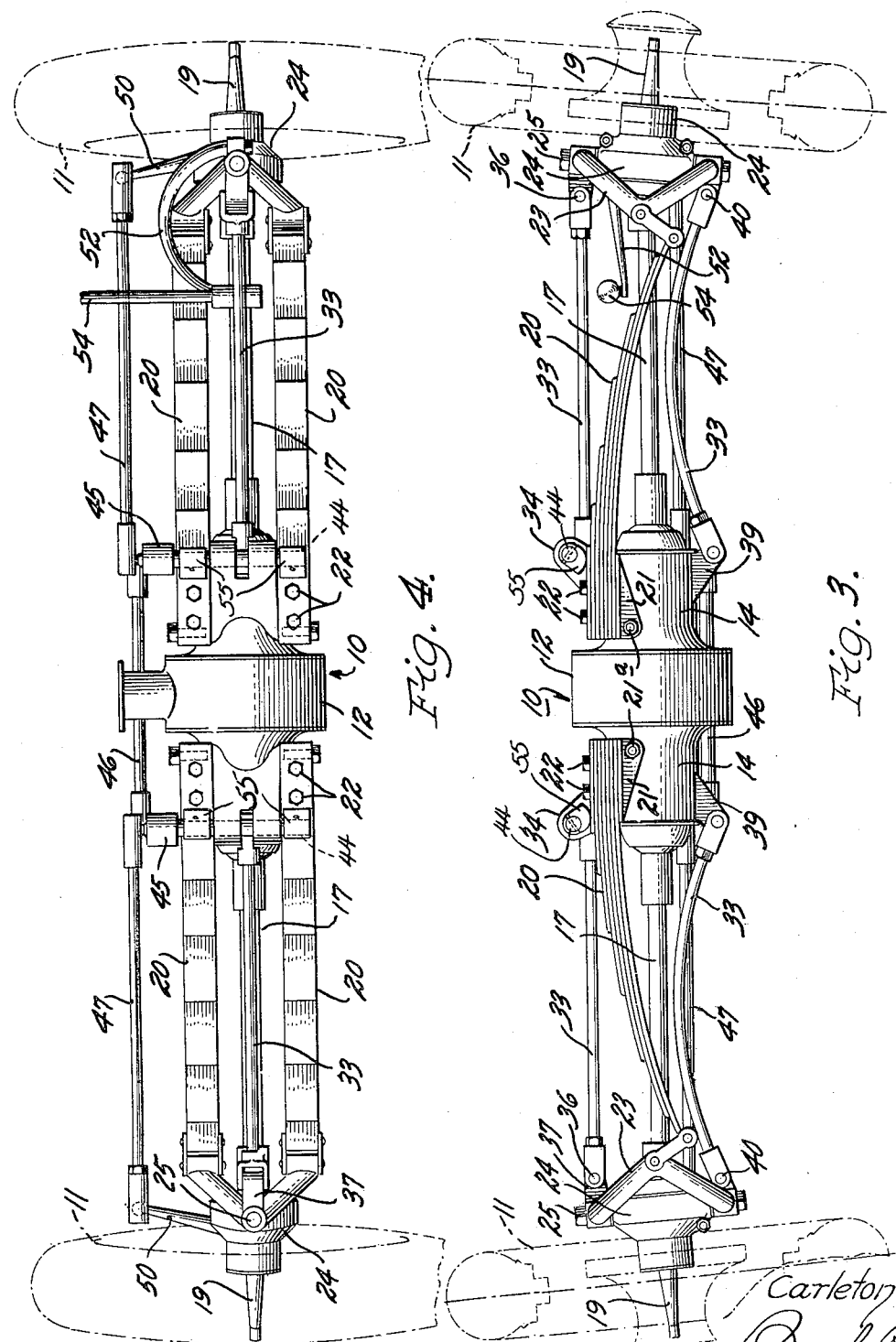

July 9, 1940.    C. W. MEGOW    2,206,970
MOTOR VEHICLE CHASSIS
Filed June 13, 1938    4 Sheets-Sheet 3
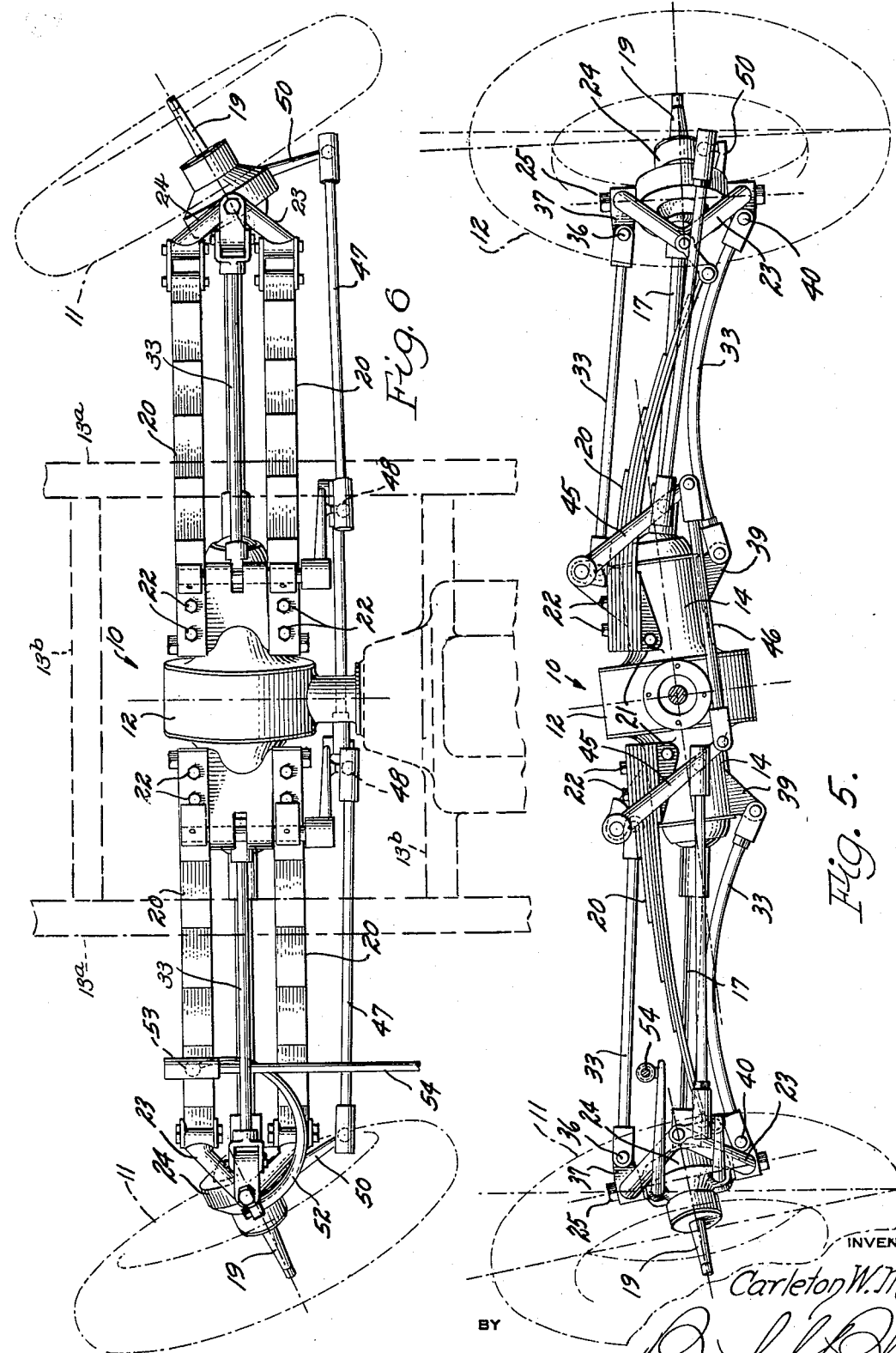
INVENTOR
Carleton W. Megow,
BY
ATTORNEYS

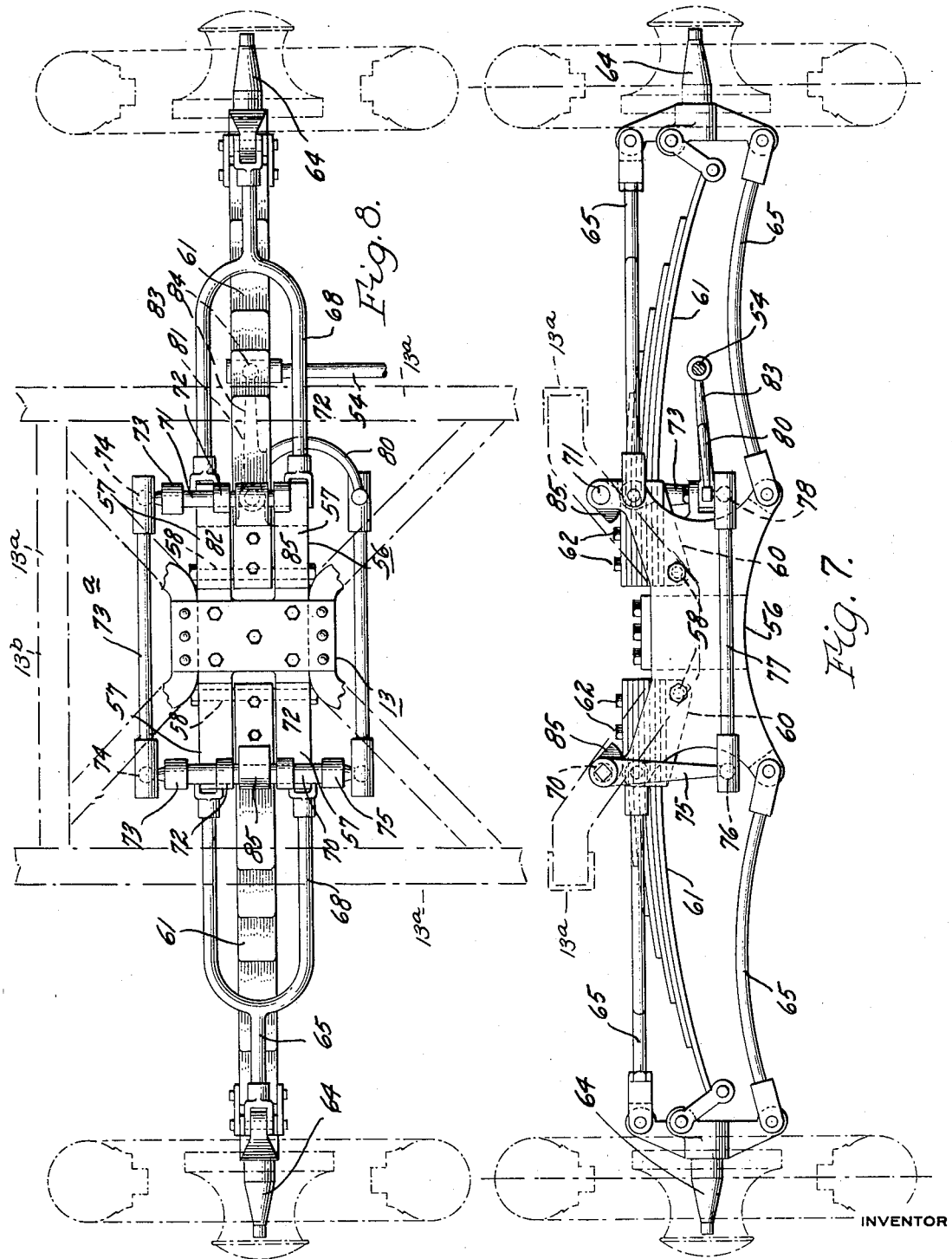

Patented July 9, 1940

2,206,970

UNITED STATES PATENT OFFICE 2,206,970

MOTOR VEHICLE CHASSIS

Carleton W. Megow, Detroit, Mich., assignor to Charles F. Megow, Detroit, Mich.

Application June 13, 1938, Serial No. 213,390

5 Claims. (Cl. 280—112)

This invention relates generally to motor vehicles and more particularly to front and rear wheel suspension.

One of the objects of the present invention is to provide a motor vehicle having new and improved individual wheel suspension.

Another object of the invention is to provide a vehicle in which on traveling of the vehicle in a curve the frame of the vehicle is tilted inward of the curve to counteract centrifugal force acting to tilt the frame outward of the curve.

Another object of the invention is to provide new and improved individual wheel suspension for a front wheel driven vehicle.

Other objects of the invention will be apparent from the following detailed description taken in connection with the accompanying drawings which form a part of this specification and in which Figure 1 is an end view of the front running gear of a vehicle as seen looking from rear to front of the vehicle;

Fig. 2 is a fragmentary enlarged view of the front wheel drive and associated structure shown partly in elevation and partly in section;

Fig. 3 is a front end view of the front wheel drive and running gear;

Fig. 4 is a plan view of the front end structure shown in Fig. 3;

Fig. 5 is a view similar to Fig. 1 showing movable parts of the vehicle substantially in positions they will assume on travel of the vehicle about a curve;

Fig. 6 is a plan view of the front end construction of the vehicle running gear and showing the movable parts substantially in the position they will assume on traveling of the vehicle about a curve;

Fig. 7 is an end view looking from front to rear of the rear end running gear and associated structure, and Fig. 8 is a top plan view of the rear end running gear shown in Fig. 7.

Referring to the drawings by characters of reference, the present motor vehicle has a front wheel drive and includes a differential gear mechanism 10 through which the vehicle front wheels, as at 11 are driven, the differential gear mechanism 10 being enclosed by a housing 12 which is rigidly secured to a frame 13 having longitudinal side members 13a rigidly connected by cross members 13b. The differential housing 12 is provided with oppositely extending hollow housing portions 14 wherein shafts 15, driven through the differential gear mechanism 10 are journaled and at their outer ends are connected by means of universal joints 16 to the ends of intermediate shafts or axles 17 the outer ends of which are connected by universal joints 18 to spindles 19 on which the front wheels 11 are mounted. The frame 13 is suspended at the front wheels by transversely extending leaf springs 20, there being a pair of such springs for each front wheel, arranged to provide individual up and down movement of the front wheels. Preferably, the springs 20 are of segmental, elliptic curvature and their inner, large or butt ends may seat on and be secured to the differential housing 12 by bolts 22 or by other suitable means. The springs 20 curve downwardly and outwardly from the differential housing 12 toward the wheels 11 and the outer and relatively small ends of the springs are pivotally connected or shackled to brackets or yokes 23, mounted on hollow steering knuckles 24 by upper and lower aligned pivot pins 25. The steering knuckles 24, Fig. 2, are adapted to pivot relative to the yokes 23 which at their outer ends, as at 26, are provided with aligning apertures to loosely receive the pins 25 which may be in the form of screws and be screwthreaded into the spindles. The outer universal joint structures 16 may include an open ended tubular member 27 splined to the outer ends of the shafts 17 and surrounding the tubular member 27 a sleeve 28 is provided at its outer end with a spherical shaped portion 29 on which the steering knuckles 24 are mounted for universal movement thereon. In the present construction, a bearing 30 having a spherical shaped inner bearing surface is provided to receive the enlarged spherical-shaped outer end 29 of the sleeve 28. The spherical ends 29 of the sleeve 28 extend respectively into the hollow steering knuckles 24, cooperating therewith to house the outer universal joints 18 and cover plates 31 apertured to receive the sleeves 28 may be provided to hold the spherical bearings 30 in place and may be rigidly secured to the steering knuckle by screws or by other suitable means.

Each of the steering knuckles 24 is pivotally connected preferably to the differential housing 12 by a pair of transversely extending vertically spaced rods or struts 33 which are positioned between the pairs of spaced leaf springs, as shown in Fig. 4. The differential housing 12 may be provided on opposite sides of the housing proper with a pair of upper spaced ears 34 having aligning apertures to receive a horizontal pivot pin 35 on which the inner ends of the upper rods 33 may be pivoted, the outer ends of the upper rods being pivoted, as at 36, to inwardly directed integral lugs 37 of the steering knuckles 24. Similarly, the lower rods 33 are pivotally connected at their inner ends by pins 38 to downwardly directed, spaced integral ears 39 of the differential housing 12 and the outer ends of the lower rods may be pivotally connected by pins 40 to inwardly directed lugs 42 provided on the steering knuckles 24. The lower rods 33 may be bowed upwardly, as shown, to give additional road clearance, if desired. The spacing between the points of the inner ends of each pair of the rods 33 is preferably the same as the spacing between the outer pivot points of the rods, lines through or joining the pivot points of each pair of the rods normally or during travel of the vehicle in a substantially straight path, describing a rectangle. Also the upwardly directed pair of ears 34 have aligning aperture above the pin 35 to receive shafts 44 fixed on and to each of which is pivoted a liner 45, the two levers 45 being pivotally connected and tied together at their lower ends by a transverse connecting rod 46.

Transverse connecting rods 47 have their inner ends connected one to each of the levers 45 by a universal connection, as at 48, and their outer ends are respectively connected by universal connections to the ends of arms 50, integral of the steering kunckles 24, the arms 50, in the present instance, extending rearwardly from the rear axle. The rods 47 together with tie rod 46 connect the wheel steering knuckles for steering movement together while the rods or struts 33 hold the front wheels in alignment with each other. Integral with one of the steering knuckles 24, an arm 52 is connected at its outer end 53 by a universal connection at one end of a rod 54 which may be operatively connected to any suitable well known type of steering gear (not shown).

Fixed to and on each of the shafts 44, immediately above the springs 20 are cams 55 which are adapted to engage and flex the springs 20.

Referring now to the rear wheel suspension, shown in Figs. 7 and 8, the frame 13 may include a central casting 56 of general H-shape with the legs 57 of the H extending transverse of the frame and having aligning apertures to receive bolts or shafts 58 which extend longitudinally of the frame and on which supporting members 60 are pivotally supported. A pair of separate, transverse leaf springs 61 are provided for individual spring suspension of the rear wheels and the large or butt ends of the springs are mounted on and may be rigidly secured one to each of the pivoted supports 60 by bolts 62 or by other suitable means. The springs 61 preferably are of elliptic curvature, curving downwardly and outwardly from their inner butt ends, and at their outer ends the springs are pivoted or shackled to inwardly directed ears 63 integral of the rear wheel spindles, as at 64. The rear wheels are held in alignment with each other by separate pairs of transverse rods or struts 65 which are similar to the struts 33 provided for the front whels. The spindles 64 are journaled to rotate in supports or bearing members 66 having integral oppositely extending vertical arms 67 to which the rods 65 are pivotally connected at their outer ends. The rods may branch into inner yoke portions 68 the inner ends of which may be pivotally connected to the legs 58 of the H-shaped casting 56.

A pair of spaced parallel shafts 70 and 71 extending longitudinally of the vehicle above the transverse rear springs 61, may be journaled in aligning apertures provided in upstanding bosses 72 integral of and positioned adjacent the outer ends of the H-shaped casting legs 58. Rearward of the springs 61, a depending lever 73 is fixed on each of the shafts 70 and 71 adjacent the rear ends thereof and this pair of levers is connected together adjacent their lower ends by a transverse tie rod 73a which has universal connection, as at 74, with the levers 73. Forward of the rear springs 61, a lever 75 is fixed adjacent its upper end to the shaft 70 and the lower end of the lever 75 is connected by a universal connection 76 to one end of a transverse rod 77, the other end of the rod 77 having a universal connection, as at 78, with one end of an arm 80 of a lever 81 having a vertical pivot 82 on the frame casting 13. The lever 81 is provided with a second laterally extending arm 83 connected at its outer end by a universal connection 84 to the rod 54 which operatively connects the rear end lever mechanism to the steering mechanism. Fixed to each of the shafts 70 and 71 immediately above the springs are cams 85 which are adapted to flex the springs 61.

When the herein described vehicle travels about a curve in the road, the turning of the wheels on steering the vehicle about the curve results in the vehicle frame and parts mounted thereon to be tilted inwardly of the curve which counteracts centrifugal force and gives substantially the same effect as is experienced on turning a banked curve. With reference to Figs. 1, 5 and 6, assume that, a left hand turn is to be made. When the operator of the vehicle turns the front wheels 11 to follow around the curve, the turning of the front wheels 11 by the steering mechanism, results in the rods 47, Fig. 1 being moved to the right pivoting levers 45 together in counterclockwise direction. When the levers 45 are pivoted in counterclockwise directions on making a left hand turn, the cam 55 on the left side of the vehicle will be moved out of engagement with the left front spring and the other cam 55 will be moved to flex the right front spring downwardly. Also as the vehicle turns to the left about a curve, the rear right wheel spring 61 will be flexed downward by the cam 85, operated by the levers 75 through the connecting links and rod 54, and pressure on the left rear spring will be released. Since the inner ends of the front and rear springs 20 and 61, respectively, are pivotally supported and their outer ends are comparatively substantially fixed, the application of pressure by the cams outward of the inner spring pivots tends to flatten the right wheel springs and tilt the frame to the left or inward of the curve. Also on tilting of the frame, the camber of the wheels is changed by the rods or struts 33, the wheels tilting to the left. From the above it will also be seen that on travel of the vehicle to the right about a curve, that the right front and rear wheel springs will be pressed downward and the left wheel springs released whereby the frame and wheels will tilt to the right or inward of the curve.

Fom the foregoing description, it will now be seen that I have provided a vehicle having new and improved individual wheel suspension. Furthermore, I have provided a vehicle in which its center of gravity is controlled and shiftable on travel of the vehicle about a curve to thereby counteract centrifugal force and consequently improve riding qualities of such vehicles.

What I claim is:

1. In a motor vehicle having a supporting frame and wheels, separate front and rear transverse spring means supporting said frame and individually connected to opposite wheels of the vehicle, said springs each having one end thereof pivoted to the frame and having its other end pivoted to its respective wheel, cam means operable for individually flexing the front springs to tilt the frame, cross members pivotally and individually connecting the frame to the front wheels and operable by and upon tilting of the frame to tilt the front wheels together laterally, lever means for operating said cam means, rear cross members pivotally and individually connecting the rear wheels to the frame and operable to tilt the rear wheels laterally together by and upon flexing of the corresponding rear spring, cam means operable to flex the rear springs individually, and lever means for operating said last-named cam means and operatively connected to said first-named lever means.

2. In a motor vehicle having a frame and wheels, separate transverse front springs pivoted at their inner ends to the frame and at their outer ends to respective front wheels, separate transverse rear springs pivoted at their inner ends to the frame and at their outer ends to respective rear wheels, said frame being tiltable transversely by flexing of the corresponding front and rear springs, cam means operable to flex corresponding front and rear springs and operatively connected together, pairs of front transverse cross members individually connecting the front wheels to the frame and operable by and upon tilting of the frame to tilt the wheels transversely, means connecting said pairs of cross members together for tilting of the front wheels together, pairs of rear transverse cross members individually connecting the rear wheels to the frame and operable by and upon tilting of the frame to tilt the rear wheels transversely, means connecting said pairs of rear cross members together for tilting of the rear wheels together, and means operatively connecting said cam means with the steering mechanism of the vehicle.

3. In a motor vehicle having a frame and wheels, a pair of springs individually suspending said frame from opposite wheels, said springs being individually flexible to tilt the frame transversely in a corresponding direction, pairs of cross members individually and pivotally connecting said wheels to the frame and operable by and upon tilting of the frame to tilt the wheels correspondingly, a pair of spaced longitudinally extending shafts mounted on the frame, cams mounted on said shafts and operable to flex said springs individually, a lever for each shaft to turn said cam means, and means connecting said levers together.

4. In a motor vehicle having a frame supported by front and rear ground engaging wheels, front and rear spring means supporting the frame on the wheels, cam means operable for individually flexing the front springs to tilt the frame, cross members pivotally and individually connecting the frame to the front wheels and operable by and upon tilting of the frame to tilt the front wheels together laterally, lever means for operating said cam means, rear cross members pivotally and individually connecting the rear wheels to the frame and operable to tilt the rear wheels laterally together by and upon flexing of the rear spring means, cam means operable to flex the rear spring means, and lever means for operating said last-named cam means and operatively connected to said first-named lever means.

5. In a motor vehicle, a frame supported on front and rear wheels, separate front springs supporting said frame respectively on the front wheels, separate rear springs supporting said frame on respective rear wheels, said frame being tiltable transversely by flexing of corresponding front and rear springs, cam means operable to flex corresponding front and rear springs, pairs of front transverse cross members individually connecting the front wheels to the frame and operable by and upon tilting of the frame to tilt the front wheels, means connecting said pairs of cross members together for tilting of the front wheels together, pairs of rear transverse cross members individually connetcing the rear wheels to said frame and operable by and upon tilting of the frame to tilt the rear wheels, means connecting said pairs of rear cross members together for tilting of the rear wheels together, and means operatively connecting said cam means with steering mechanism of the vehicle.

CARLETON W. MEGOW.